Patented Aug. 23, 1949

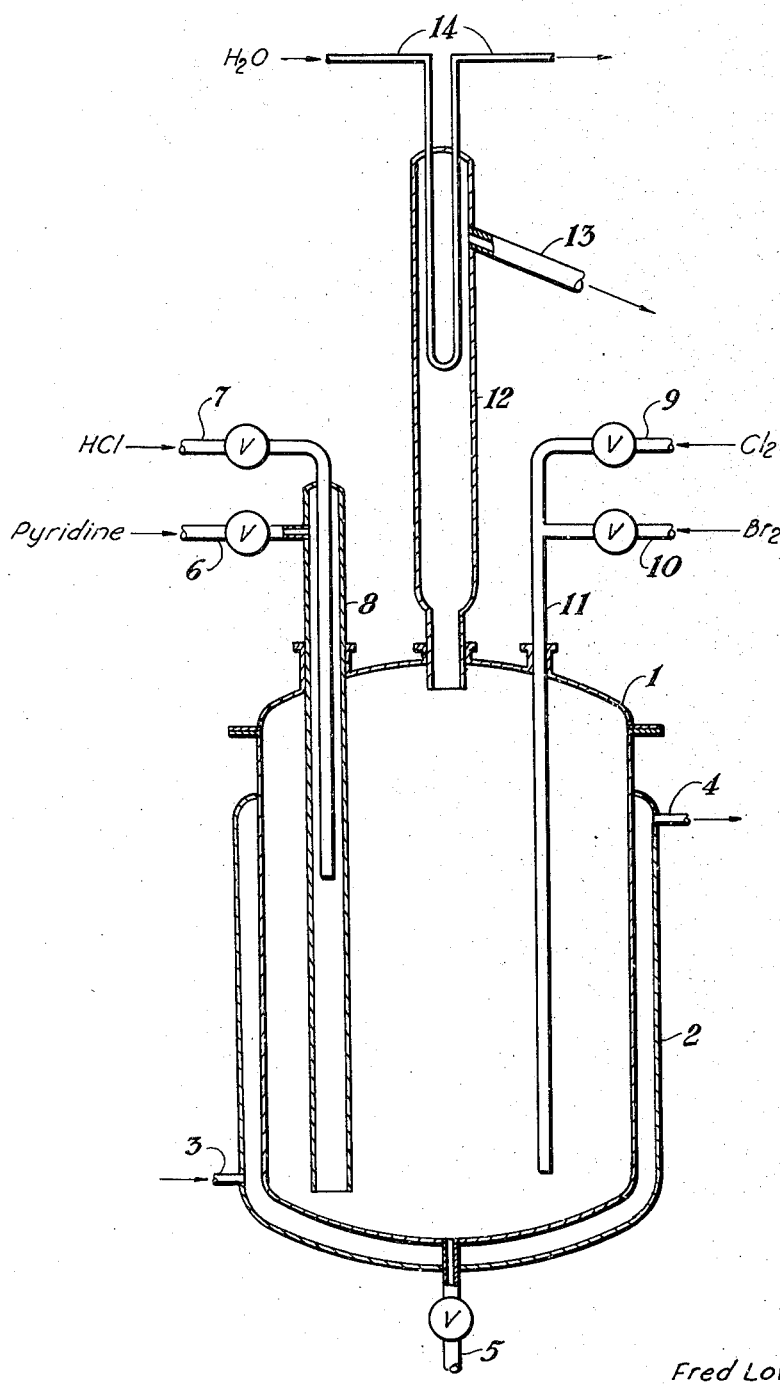

2,480,091

UNITED STATES PATENT OFFICE 2,480,091

PRODUCTION OF 3-BROMOPYRIDINE AND ITS HYDROCHLORIDE

Fred Lowell Taylor, Midland, Mich., assignor to The Dow Chemical Company, Midland, Mich., a corporation of Delaware Application September 18, 1944, Serial No. 554,644

9 Claims. (Cl. 260—290)

This invention concerns an improved method for the production of 3-bromopyridine or its hydrochloride.

It is known that 3-bromopyridine is formed when a mixture of bromine and pyridine is heated to a reaction temperature of 200° C. or thereabout, but that the yield of 3-bromopyridine is low and by-products such as dibromopyridine and tarry materials are formed in large amount. It is also known that the tarry substances are formed in lesser amount and the yield of the monobrominated product, e. g. 3-bromopyridine hydrochloride, is improved somewhat when employing a pyridine salt, e. g. pyridine hydrochloride, instead of pyridine itself as the compound to be brominated. However, even when brominating such pyridine salt, by-products, particularly dibromopyridine, have been formed in large amount and the yield of the 3-bromopyridine salt has generally been less than 45 per cent of theoretical, based on the starting materials consumed. A large part, e. g. approximately half, of the bromine used as a starting material has, of course, been consumed in forming hydrogen bromide.

It is an object of this invention to provide an improved method of brominating pyridine hydrochloride to form 3-bromopyridine hydrochloride which permits the reaction to be carried out in continuous manner with removal of 3-bromopyridine hydrochloride from the reaction mixture as it is formed. Another object is to provide such a method which permits continuous removal from the reaction mixture of certain by-products which, I have found, retard the rate at which the bromination reaction may be continued. A further object is to provide such a method whereby a greater proportion of the bromine starting material may be utilized in forming nuclear brominated pyridine compounds than has heretofore been possible. A still further object is to provide such a method which involves a simple and novel procedure for supplying a large part of the heat requirements of the process. Other objects will be apparent from the following description of the process.

In studying the bromination of pyridine and its hydrochloride, I confirmed the fact, previously reported, that tarry by-products are formed in lesser amount when employing pyridine hydrochloride, rather than pyridine, as the compound to be brominated. I also made the following discoveries concerning the reaction system for the bromination of pyridine hydrochloride:

(1) I found, suprisingly, that the product, 3-bromopyridine hydrochloride, has a boiling point considerably lower than that of pyridine hydrochloride and, consequently, that the 3-bromopyridine hydrochloride may be distilled from the reaction mixture as it is formed.

(2) Such removal of the 3-bromopyridine hydrochloride as it is formed reduces the amount of 3.5 - dibromopyridine (or its hydrochloride) formed as a by-product.

(3) The hydrogen halide evolved during the bromination reaction consists for the most part of hydrogen chloride rather than the hydrogen bromide which was expected.

(4) The discovery last mentioned led to a suspicion that hydrogen bromide formed in the bromination reaction displaces hydrogen chloride from the pyridine base hydrochlorides and converts the latter into hydrobromides. This was confirmed experimentally, i. e. pyridine hydrobromide is formed in considerable amount. It is probable that other pyridine base hydrobromides such as 3-bromopyridine hydrobromide and 3.5-dibromopyridine hydrobromide are also formed.

(5) The pyridine hydrobromide formed as a by-product in the reaction greatly retards the rate at which the bromination reaction continues and, itself, undergoes nuclear bromination at a lesser rate than does pyridine hydrochloride. It is believed that other pyridine base hydrobromides formed in the reaction behave similarly to pyridine hydrobromide in these respects.

(6) The pyridine base hydrobromides may be converted into corresponding hydrochlorides by passing chlorine into the reaction mixture.

(7) Such introduction of chlorine liberates free bromine from the pyridine base hydrobromides and renders the bromine thus liberated from the hydrobromide radical available for nuclear bromination of a further amount of the pyridine hydrochloride.

(8) By introducing both chlorine and bromine as starting materials in the bromination reaction, the formation of pyridine base hydrobromides may be suppressed or avoided and the rate of the bromination reaction may be increased.

(9) By such introduction of both chlorine and bromine as starting materials in the bromination reaction, a greater proportion of the bromine may be utilized for nuclear bromination of the pyridine compounds than is possible when using bromine alone as the halogen starting material.

(10) Such introduction of both chlorine and bromine to the reaction may be accomplished without appreciable increase in nuclear chlorination of the pyridine hydrochloride over the slight extent to which nuclear chlorination occurs when bromine alone is introduced as the halogen reactant, i. e. I have obtained chloropyridine hydrochloride in about 0.5 per cent yield when using substantially pure bromine as the halogen reactant in brominating pyridine hydrochloride.

(11) The 3.5-dibromopyridine (or its hydrohalide) formed as a by-product in the bromination reaction has an effect, similar to that of pyridine hydrobromide, of retarding greatly the rate at which the nuclear bromination reaction may be continued.

(12) The 3.5-dibromopyridine (which has a boiling point nearly the same as that of pyridine hydrochloride, i. e. 222° C.) may be distilled as it is formed from the reaction mixture. Whether the ease with which the dibromopyridine is distilled to leave the major part of the pyridine hydrochloride in the residual reaction mixture is due to a slight difference in boiling point of the two compounds or is due to the dibromopyridine distilling (possibly as an azeotrope with one or more other components of the mixture) at a temperature below its normal boiling point has not been ascertained and is only of academic interest. The important thing is that the 3.5-dibromopyridine may be distilled from the mixture as it is formed so as to avoid its normal effect of retarding the rate at which the reaction for the nuclear bromination of pyridine hydrochloride may be continued.

It is to be noted that the 3.5-dibromopyridine distills from the reaction mixture at, or somewhat below, its normal boiling point and, therefore, that it is evidently said compound, rather than its hydrochloride which undergoes distillation, even though, due to the presence of hydrogen chloride in the vapors which are evolved, the hydrochloride of the compound is obtained in the distillate. This point is mentioned because the compounds pyridine hydrochloride, pyridine hydrobromide and 3-bromopyridine hydrochloride have boiling points above and distinct from those of the corresponding free pyridine bases and, accordingly, are apparently stable at temperatures above the boiling points of the corresponding free bases.

(13) The reaction may advantageously be carried out in continuous manner, i. e. with feed of the starting materials to the reaction zone at rates corresponding approximately to those at which brominated products are distilled from the reaction mixture.

(14) The brominated pyridine compounds which are vaporized, together with hydrogen chloride, from the reaction mixture may advantageously be condensed by treating the vapors with sufficient water to form an aqueous solution of the brominated products. This step is of importance since the brominated products are solids of quite high melting point and condensation merely by cooling the vapor mixture may result in plugging of the apparatus.

(15) A considerable part, if not all, of the heat required for the bromination reaction and for distillation of the brominated products may advantageously be supplied by forming the pyridine hydrochloride from pyridine and hydrogen chloride preferably, though not necessarily, within the reaction vessel, but at a point preceding that at which bromine contacts the pyridine hydrochloride.

With regard to the last-mentioned discovery (15), it should be explained that the reaction mixture for the bromination of pyridine hydrochloride is extremely corrosive at the reaction temperature to usual metal apparatus, e. g. apparatus constructed of iron or steel, and that heat for in excess of that generated by the bromination reaction is required in order to distill the brominated products from the reaction mixture as they are formed. Although it is possible that certain of the acid-resistant metals or alloys such as gold, or alloys comprising chromium and iron, etc., may be sufficiently resistant to corrosion to permit employment in the process, and the use of such metal apparatus is not excluded from the scope of the invention, apparatus constructed of, or lined with, such metals or alloys is expensive. Accordingly, for purpose of economy, the reaction vessel employed in commercial practice of the invention is usually constructed of, or lined with, a corrosion-resistant substance such as glass, enamel, or a ceramic. However, these corrosion-resistant materials are poorer conductors of heat than are the structural metals and they are susceptible to damage, e. g. cracking or shattering, if unevenly heated. Because of the large amount of heat which is required to distill the brominated products from the reaction mixture at a satisfactory rate and the relatively poor heat conductivity of the corrosion-resistant material, external heating to supply the heat of distillation results in a considerable temperature gradient through the wall of the reactor and is likely to result in cracking or shattering of the corrosion-resistant material. The reaction between pyridine and hydrogen chloride to form pyridine hydrochloride is highly exothermic. By utilizing the heat of this reaction to supply much, e. g. usually about three-fourths, of the heat requirements of the process, the reactor is heated internally and the likelihood of it being damaged is reduced or avoided. Additional heat may be supplied by heating or boiling the pyridine prior to admixture with the hydrogen chloride and also by externally heating the reactor, e. g. by means of a heating fluid. Other modes of heating, such as by passing an electric current through the reaction mixture, may be employed if desired.

On a basis of the foregoing discoveries, the following improved method for the production of 3-bromopyridine hydrochloride, or 3-bromopyridine, has been devised.

The invention comprises four new steps or conditions for carrying out the bromination reaction, viz.: (1) Distilling 3-bromopyridine hydrochloride and 3.5-dibromopyridine from the reaction mixture as they are formed; (2) introducing chlorine as well as bromine as a starting material so as to convert pyridine base hydrobromides into corresponding hydrochlorides and thus avoid the reaction-retarding effect of the hydrobromides while at the same time rendering a large part of the bromine employed as a starting material available for nuclear bromination of the pyridine compounds; (3) supplying a large part of the heat required in the process by employing pyridine and hydrogen chloride as starting materials and reacting them with resultant liberation of much heat; and (4) treating the evolved vapors with sufficient water to condense and form an aqueous solution of the brominated pyridine compounds.

Each of the new operative steps or conditions just enumerated is, in itself, an advance over prior practice, and the advantages of these several steps and conditions are additive. Accordingly, optimum results are obtained when all of these new features are employed, but the invention is of a scope such as to encompass a process for the bromination of pyridine hydrochloride wherein only the first of the above-enumerated new features, or wherein a combination of the first and one or more of the other new features, is employed. The invention comprises certain other new operations which are less important than those just mentioned. They will be brought out in describing the preferred mode of practicing the invention.

The accompanying drawing is a diagrammatic sketch of one of the various arrangements of apparatus which may be used in practicing the invention. In the drawing, the numeral 1 designates a reaction vessel which is constructed of, or lined with, acid-resistant material such as glass, enamel, a ceramic, or a corrosion-resistant metal or alloy. The vessel 1 is provided with a surrounding jacket 2 having an inlet 3 and outlet 4 through which a heating fluid, e. g. steam or oil, etc., may be circulated for purpose of heating the vessel. At the bottom, vessel 1 is provided with a valved outlet 5. The valved lines 6 and 7, for pyridine and hydrogen chloride, respectively, connect with an inlet 8 in such manner that materials introduced through the lines 6 and 7 are contacted and admixed inside of inlet 8 at a point well within the vessel 1, i. e. the terminal section of inlet 8 serves as a mixing and reaction chamber. The valved lines 9 and 10, for chlorine and bromine, connect with a common inlet 11 for the introduction of halogens into vessel 1. At its top vessel 1 is provided with a still head 12 having an outlet 13 which connects with apparatus, not shown, for separating and purifying products distilled from the vessel 1. A line 14, for water or other cooling fluid, projects inside the upper secttion of the still head 12 and serves to condense unreacted pyridine hydrochloride vapors and cause return of the latter to vessel 1. The pyridine hydrochloride vapors, upon being condensed, absorb bromine if it is present in the vapor mixture. Thus bromine vapors are condensed and returned to the reaction. The use of such means for dephlegmating the vapors within still head 12 is not essential and the cooling line 14 may be omitted. The reaction may be carried out with vaporization of little, if any unreacted bromine from the reaction mixture. Because of the corrosiveness toward usual structural metals of the reaction mixture being dealt with, the structural elements 6—14, just mentioned, may advantageously be constructed of glass or other corrosion-resistant material.

It will, of course, be understood that the apparatus shown in the drawing is illustrative and that other arrangements of apparatus may be employed in practicing the invention. For instance, instead of mixing the hydrogen chloride and pyridine within a section of inlet 8 inside of vessel 1, the mixing to form pyridine hydrochloride may be accomplished in a chamber outside of vessel 1 and the resultant pyridine hydrochloride vapors may be fed directly into vessel 1. In such instance, the mixing chamber and the line connecting the same with vessel 1 are preferably insulated against heat loss so as to conserve and utilize the heat of reacttion. Again, the chlorine and bromine may be introduced separately or alternately, instead of simultaneously through a common inlet, into vessel 1. Other ways in which the apparatus shown in the drawing may be changed or modified will be apparent.

In employing the apparatus of the drawing for the continuous production of 3-bromopyridine hydrochloride, the vessel 1 may first be charged, e. g. to from ¼ to ⅔ of its capacity, with pyridine. Hydrogen chloride may be introduced through inlet 7 so as to form pyridine hydrochloride within the vessel. Heat generated by the reaction serves to heat the vessel and its contents gradually to approach the temperature of 160° C. or above at which the reaction for bromination of the pyridine hydrochloride is to be carried out. While feeding hydrogen chloride into the vessel, a heating fluid, e. g. heated oil or steam, is preferably circulated through the jacket 2 so as to heat the outer wall of vessel 1 at the same time that the latter is being heated internally. The rate of introduction of the hydrogen chloride and of external heating of the vessel 1 should be such as to cause only gradual heating, e. g. they may be such as to heat the vessel and its contents to a temperature of 160° C. in a period a half hour or more.

When the pyridine within vessel 1 has been converted to pyridine hydrochloride and the vessel and its contents have been heated to a temperature of 160° C. or above, pyridine is introduced through line 6 and inlet 8 and chlorine and bromine are introduced through the respective lines 9 and 10 and the common inlet 11. For purpose of economy and convenience of operation, the pyridine and hydrogen chloride are preferably introduced in equimolecular proportions. However, either of these starting materials may be used in molecular excess over the other. As hereinbefore mentioned, the employment of pyridine in molecular excess over the hydrogen chloride results in an increase in the formation of tarry by-products, but the use of a 10 to 20 per cent molar excess of pyridine over the hydrogen chloride may be tolerated. The use of hydrogen chloride in amount greatly exceeding the molecular equivalent of pyridine has no detrimental effect upon the bromination reaction.

The chlorine and bromine are preferably also introduced in equimolecular proportions. However, bromine alone may, though less satisfactorily, be employed as the halogen starting material or, if desired, a moderate excess, e. g., a 10 per cent excess, of chlorine over the molecular equivalent of the bromine may be used without excessive increase in the amount of by-product formation. In general, the yield of 3-bromopyridine hydrochloride becomes higher and the yield of dibromopyridine decreases with increase in the ratio of pyridine hydrochloride to bromine in the reaction mixture. For this reason, the reaction is advantageously carried out so as to maintain at least 5, and preferably 10 or more, molecular equivalents of pyridine hydrochloride per mole of bromine in the reaction mixture throughout most of the reaction period. In continuous operation, once an inventory of pyridine hydrochloride in such proportion has been established in the reaction zone, halogen (i. e. bromine or a mixture of bromine and chlorine) and additional pyridine hydrochloride may be fed to said zone in approximately equimolecular proportions. In practice, the rates of feed of halogen and pyridine hydrochloride are often varied, e. g. in some instances as much as 100 per cent from the theoretical equimolecular proportion of the two reactants so as to compensate for the consumption or loss of either reactant due to by-product formation or vaporization from the reaction mixture.

It is important that the reaction be carried out under substantially anhydrous conditions since water, if present, promotes by-product formation. Strictly anhydrous conditions are difficult to attain and are not required. However, the reaction mixture should contain less than 5 per cent by weight of water.

During operation in such manner, the mixture within vessel 1 may be maintained at atmospheric pressure, at subatmospheric pressure, or even at a pressure somewhat above atmospheric, e. g. at a pressure as high as 15 pounds per square inch gauge. In any instance, the reaction mixture is heated sufficiently to distill 3-bromopyridine hydrochloride and 3.5-dibromopyridine from the mixture as they are formed when operating at atmospheric pressure, the temperature to which the reaction mixture is heated in order to cause the distillation is usually about 220° to 230° C. When the reaction mixture is maintained at an absolute pressure of only 150 mm. of mercury, the products may be distilled therefrom by heating the mixture at a temperature of about 170° to 175° C. Usually the reaction is carried out under vacuum in order to facilitate distillation of the 3-bromopyridine hydrochloride and the 3.5-dibromopyridine and, also, so as to aid in vaporizing bromine and drawing the bromine vapors into the reaction zone.

The vapors evolved from the reaction mixture comprise not only the 3-bromopyridine hydrochloride and 3.5-dibromopyridine produced in the reaction, but also pyridine hydrochloride, hydrogen chloride, possibly a minor amount of hydrogen bromide, and in some instances unreacted halogen. In order to avoid loss of bromine in the vapors which are evolved, the latter are preferably dephlegmated, e. g. by contact with the cooling element 14, so as to condense and cause return to the vessel 1 of pyridine hydrochloride, which, upon condensation, absorbs bromine vapors.

The uncondensed vapors of 3-bromopyridine hydrochloride, 3.5-dibromopyridine and hydrogen chloride may be treated in any of several ways to separate the 3-bromopyridine hydrochloride product. Such vapor mixture, as it flows from the reaction vessel 1, is preferably treated with sufficient water to condense the 3-bromopyridine hydrochloride and the 3.5-dibromopyridine with formation of an aqueous solution thereof. Alternatively, the vapor mixture of 3-bromopyridine hydrochloride, 3.5-dibromopyridine and hydrogen chloride may be contacted with a cooling surface, e. g. the surface of an internally cooled drum, to cool and condense the 3-bromopyridine hydrochloride and the 3.5-dibromopyridine as solids, leaving the hydrogen chloride in an anhydrous gaseous form suitable for reuse in the process. Due to the presence of the hydrogen chloride in the vapor mixture the 3.5-dibromopyridine during condensation is, of course, converted into its hydrochloride and is collected as such.

The mixture comprising 3-bromopyridine hydrochloride and 3.5-dibromopyridine collected in either of such ways may be treated, e. g. with sodium thiosulphate, to destroy any trace of free halogen present. It may then be treated with an aqueous alkali solution, e. g. a solution of sodium or potassium hydroxide, to decompose the hydrochlorides and liberate the pyridine bases. The latter may be separated from the mixture and isolated as the individual compounds by steam distillation and subsequent fractional distillation, or in other usual ways.

By operating as just described, 3-bromopyridine may readily be produced in yields of from 60 to 70 per cent of theoretical, based on the amount of pyridine consumed in the bromination reaction.

In the process as just described all four of the new operative steps and conditions provided by the invention are employed. However, 3-bromopyridine may be produced in yields higher than are obtainable by prior processes, when employing only one or more of these new operative steps or conditions. For instance, by carrying the gromination out using bromine alone as the halogen starting material, but distilling the 3-bromopyridine hydrochloride and dibromopyridine from the mixture as they are formed, 3-bromopyridine hydrochloride may be produced in a yield of about 50 per cent of theoretical or higher. Further increases in the yield of 3-bromopyridine base on the bromine starting material and in the rate of the bromination reaction may be obtained by introducing chlorine as well as bromine as a starting material in the reaction. Thus, it will be seen that the improved process provided by the invention may be modified in any of several ways and that the invention is not restricted to the instance in which all of the new operative steps and conditions hereinbefore mentioned are employed in conjunction with one another.

The following examples describe certain ways in which the principle of the invention has been employed, but are not to be construed as limiting the invention.

EXAMPLE 1

The purpose of this example is to present data on the rates of reaction at various temperatures for the nuclear bromination of the compounds, pyridine hydrochloride and 3-bromopyridine hydrochloride. The procedure in carrying out each experiment was to heat 2 gram moles of the pyridine base hydrochloride on an oil bath to a temperature somewhat below that at which the measurement was to be made and add 8 grams (0.05 gram mole) of bromine in less than one minute. Due to the reaction which occurred, the mixture was heated spontaneously to the temperature of the measurement. The spontaneous rise in temperature was usually about 3° C. During the addition of bromine and the subsequent spontaneous heating of the mixture, both the reaction mixture and the surrounding oil bath were stirred vigorously and the bath was itself heated carefully, but quickly, to the temperature at which the rate of reaction was to be measured. After a few preliminary tests, it was found that both the reaction mixture and the oil bath could quickly and accurately be brought to the desired reaction temperature. The time of reaction was considered as starting with start of the bromine addition. After the mixture was heated to the desired reaction temperature (which usually required only a few moments) both the mixture and the surrounding bath were maintained at a constant temperature throughout the reaction period. Aliquot portions of the reaction mixture were withdrawn at measured intervals during the reaction. Each sample thus withdrawn was promptly cooled, weighed, dissolved in glacial acetic acid and the solution was treated with water and molecular excess of potassium iodide over the amount of bromine which could possibly be present. The solution was then titrated with a standard sodium thiosulphate solution to determine the amount of free bromine which had been present in the sample of the reaction mixture when it was withdrawn for analysis. From the data collected in the series of experiments, the rates of reaction, $K_1$, for the nuclear bromination at each of several temperatures of pyridine hydrochloride and the corresponding rates of reaction, $K_2$, for the nuclear bromination of 3-bromopyridine hydrochloride were calculated in known manner. In the present instance, each of the rates of reaction, $K_1$ and $K_2$, represents the proportion of reactive bromine present in the reaction mixture at any instant which is being consumed per minute in causing nuclear bromination of the pyridine compound employed. The rates of reaction correspond to those of first order reactions. The half-life period (expressed in minutes) of the bromine employed as a starting material in each of the bromination reactions at each of the temperatures at which the tests were carried out were also calculated in known manner from the data which was collected. The following table gives the rates of reaction, $K_1$ and $K_2$, for the nuclear bromination of the respective compounds, pyridine hydrochloride and 3-bromopyridine hydrochloride, as determined at each of the temperatures mentioned. It also gives the half-life periods for bromine in each bromination reaction at the respective temperatures at which the bromination reactions were carried out. The table includes the ratio of $K_1$ to $K_2$ at each of the temperatures at which the reactions were carried out.

*Table I*

| Reaction Temp., °C. | $K_1$ | $K_2$ | $K_1/K_2$ | Half-Life Period of Bromine in Bromination of— | |
|---|---|---|---|---|---|
| | | | | Pyridine Hydrochloride | 3-Bromopyridine Hydrochloride |
| 150 | 0.019 | 0.0087 | 2.2 | 36 | 80 |
| 160 | 0.038 | 0.0157 | 2.4 | 18 | 44 |
| 170 | 0.075 | 0.028 | 2.7 | 9.2 | 25 |
| 180 | 0.145 | 0.048 | 3.0 | 4.8 | 14.5 |

From this data it will be seen that pyridine hydrochloride undergoes nuclear bromination more rapidly than 3-bromopyridine hydrochloride, but that the rates of reaction do not differ greatly. It will also be seen that the ratio, $K_1/K_2$, becomes higher as the reaction temperature is raised. However, by-product formation also increases as the reaction temperature is raised; hence, the advantage of raising the reaction temperature, e. g. from 160° to 230° C., is not as great as might be thought from the data in the table. Due to the high molecular ratio of pyridine hydochloride to bromine in the experiments on which the above data is based, the concentrations of the reaction products were small and their influence on the rate of reaction was also small. The above data serves as a basis for comparison with other experiments wherein by-products normally formed in the reaction are initially added for purpose of determining their effect on the rate of reaction.

EXAMPLE 2

The rates at which pyridine hydrochloride undergoes nuclear bromination at a temperature of 165° C., in the presence of initially added pyridine hydrobromide and, in a separate series of experiments, in the presence of initially added 3.5-dibromopyridine hydrochloride were determined. The procedure was the same as that described in Example 1, except that in each of one series of experiments a mixture of pyridine hydrochloride and pyridine hydrobromide, instead of pyridine hydrochloride alone, was used as a starting material and in each of the other series of experiments a mixture of pyridine hydrochloride and 3.5-dibromopyridine hydrochloride was use as a starting material. In all of the experiments, the proportion of bromine employed corresponded to 0.025 of the molecular equivalent of the sum of the quantities of the two pyridine compounds used as starting materials, i. e. in each experiment 0.05 gram molecular weight of bromine and a total of 2 gram molecular weights of the two pyridine compounds were used. Table II names and states the molecular proportions of the two pyridine compounds used as starting materials in each experiment and gives the rates determined for the reaction of bromine to cause nuclear bromination of the respective pyridine compounds. The reaction rates given express the proportion of the bromine present at any instant which is being consumed per minute. The table also expresses each rate of reaction as per cent of the "normal rate" of bromination, i. e. the rate at which bromine reacts with pyridine hydrochloride alone at 165° C., which normal rate, as interpolated from the values given in Table I is 0.053.

*Table II*

| Pyridine Compounds Employed | | | Rate of Reaction | Reaction Rate as Per Cent of Normal Rat |
|---|---|---|---|---|
| Pyridine Hydrochloride gm. Moles | Added Pyridine Compound | | | |
| | Kind | gm. Moles | | |
| 1.8 | Pyridine Hydrobromide | 0.2 | 0.0318 | 60 |
| 1.6 | do | 0.4 | 0.0159 | 30 |
| 1.2 | do | 0.8 | 0.0066 | 12.5 |
| 1.8 | 3.5-dibromo-pyridine hydrochloride | 0.2 | 0.0371 | 70 |
| 1.6 | do | 0.4 | 0.0223 | 42 |

From the data given in Table II it will be seen that the compounds, pyridine hydrobromide and 3.5-dibromopyridine hydrochloride, formed as by-products in the bromination of pyridine hydrochloride, have an effect of retarding the rate of further bromination, which effect becomes more pronounced as such by-products accumulate in the reaction mixture.

EXAMPLE 3

In each of a series of experiments, pyridine hydrochloride was heated to about 170° to 180° C., and bromine was introduced gradually in the amount stated in Table III. After completing the bromination reaction, 3-bromopyridine hydrochloride and 3.5-dibromopyridine were distilled from the mixture. The distillate was dissolved in water and treated with alkali to decompose the brominated pyridine salts and liberate the bromopyridines as the free compounds. The mixture of 3-bromopyridine and 3.5-dibromopyridine thus formed was recovered from the aqueous mixture and separated into its components by fractional distillation. Table III states the molecular ratio of bromine to pyridine hydrochloride employed in each experiment, gives the molecular ratio in which 3-bromopyridine and 3.5-dibromopyridine were obtained and gives the yield of 3-bromopyridine, based on the bromine employed. It also gives the per cent of the bromine employed which was contained in the 3-bromopyridine product.

*Table III*

| Run No. | Mole Ratio Br₂/Pyridine Hydrochloride | Results | | |
|---|---|---|---|---|
| | | Mole Ratio of 3-Bromopyridine to 3.5-Dibromopyridine | Per Cent Yield of 3-Bromopyridine | Bromine Content of 3-Bromopyridine as Per Cent of Br₂ Employed |
| 1 | 0.1 | 18 | 72.0 | 36.0 |
| 2 | 0.2 | 6.2 | 57.5 | 28.8 |
| 3 | 0.3 | 4.0 | 50.0 | 25.0 |
| 4 | 0.4 | 2.18 | 40.7 | 20.4 |

The table illustrates the fact that by-product formation increases sharply with increase in the molecular ratio of bromine to pyridine hydrochloride from 0.1 to 0.2, after which the increase occurs more gradually.

EXAMPLE 4

The series of batchwise experiments described in Example 3 was repeated, except that in this instance an equimolecular mixture of chlorine and bromine, instead of bromine alone, was introduced as a starting material. Table IV states the molecular ratio of halogen (i. e. chlorine plus bromine) to pyridine hydrochloride for each experiment. It also gives the molecular ratio of 3-bromopyridine hydrochloride to 3.5-dibromopyridine in the products and the per cent yield of 3-bromopyridine, based on the combined amount of the two halogens employed as a starting material. It also states the per cent by weight of the bromine employed which was contained in the 3-bromopyridine product.

*Table IV*

| Run No. | Mole Ratio of Halogen to Pyridine Hydrochloride | Results | | |
|---|---|---|---|---|
| | | Mole ratio of 3-Bromopryridine to 3.5-Dibromopyridine | Per Cent Yield of 3-Bromopyridine | Bromine Content of 3-Bromopyridine as Per Cent of Br₂ Employed |
| 1 | 0.1 | 49 | 62.5 | 62.5 |
| 2 | 0.2 | 7.8 | 48.7 | 48.7 |
| 3 | 0.3 | 5.0 | 40.7 | 40.7 |
| 4 | 0.4 | 3.9 | 38.1 | 38.1 |

From a comparison of Table IV with Table III, it is apparent that the employment of a mixture of chlorine and bromine, instead of bromine alone, as a halogenating agent greatly increases the proportion of the bromine utilized for nuclear bromination of the pyridine hydrochloride and that it also increases the molecular ratio of 3-bromopyridine to 3.5-dibromopyridine in the reaction products.

EXAMPLE 5

The pot of a still was charged with 412 grams (5.21 moles) of pyridine and anhydrous hydrogen chloride was introduced in amount sufficient to convert the pyridine to pyridine hydrochloride. Heat generated by the reaction caused fusion of the pyridine hydrochloride product. Thereafter a total of 647 grams (8.19 moles) of pyridine, approximately 13.4 gram moles of hydrogen chloride, 392 grams (2.45 moles) of bromine and 154 grams (2.17 moles) of chlorine was introduced over a period of about 5 hours while heating the mixture so as to fractionally distill 3-bromopyridine hydrochloride and 3.5-dibromopyridine from the mixture as they were formed. Sufficient water was added near the top of the distilling column to cause partial condensation and reflux of material within the column without introducing more than a minor amount of water into the pot of the still, i. e. most of the water thus added was, itself, vaporized. The pyridine and hydrogen chloride were introduced in such manner as to become admixed within the pot of the still at a point remote from that at which the halogens were introduced. In this way the pyridine was converted into its hydrochloride before being contacted with the halogens. The chlorine and bromine were introduced in admixture with one another through a common inlet. Throughout the reaction, the mixture in the pot of the still was heated at approximately atmospheric pressure to a temperature of about 222° C. The vapors evolved during the reaction comprised hydrogen chloride, pyridine hydrochloride, 3-bromopyridine hydrochloride, and 3.5-dibromopyridine. As the vapors flowed from the head of the distilling column they were treated with sufficient water to condense the pyridine compounds and form an aqueous solution thereof. The aqueous solution thus obtained was treated with sodium hydroxide to decompose the salts of the pyridine compounds and liberate the latter in free form. The mixture was then analyzed to determine the pyridine compounds present. It was found to contain 244.5 grams (3.1 moles) of pyridine, 512.5 grams (3.24 moles) of 3-bromopyridine, and 20.5 grams (0.087 mole) of 3.5-dibromopyridine. The residue from the distillation was also treated with alkali and analyzed. It was found to contain 433 grams (5.48 moles) of pyridine, 28 grams (0.177 mole) of 3-bromopyridine, and 6.5 grams (0.027 mole) of 3.5-dibromopyridine. Accordingly, from the reaction there were obtained a total of 677.5 grams (8.58 moles) of pyridine, 540.5 grams (3.42 moles) of 3-bromopyridine, and 27 grams (0.114 mole) of 3.5-dibromopyridine. Of the pyridine employed as a starting material, 36 per cent was consumed in the reaction. The yield of 3-bromopyridine was approximately 70 per cent of theoretical, based on the starting materials consumed. The ratio by weight of 3-bromopyridine to 3.5-dibromopyridine in the reaction products was 20.

EXAMPLE 6

70 pounds (0.886 mole) of pyridine was placed in a glass-lined retort and 33 pounds (0.904 mole) of hydrogen chloride was added gradually, whereby the mixture within the retort was heated due to the heat of reaction to a temperature of approximately 170° C. While adding the hydrogen chloride, the retort was heated externally so as to maintain the outer portions of its wall at about the same temperature as that of the mixture within the retort. Vacuum was then applied so as to reduce the pressure within the retort to about 150 mm. absolute. Pyridine and hydrogen chloride in approximately equimolecular amounts were thereafter fed into the retort where they were mixed to form pyridine hydrochloride at a point remote from that at which a mixture of bromine and chlorine was also introduced. While continuing such introduction of the starting materials, 3-bromopyridine hydrochloride and 3.5-dibromopyridine were distilled from the reaction mixture as they were formed. When continuous operation in such manner was first started, bromine alone was introduced in vaporized form at a rate of 20 pounds of bromine per hour. Such introduction of bromine alone was continued for a period of about 15 minutes so as to establish an inventory of bromine in the reaction mixture. Thereafter, the introduction of bromine as well as pyridine and hydrogen chloride was continued, but chlorine also was introduced together with the bromine at a rate of 8.9 pounds per hour. The rate of feed of the pyridine and hydrogen chloride mixture was controlled so as to maintain a substantially constant inventory of materials within the retort. Operation in such continuous manner was carried out over a period of 32 hours, during which period the mixture within the retort was maintained at a temperature of about 175° C. while distilling the brominated pyridine compounds from the mixture as they were formed. At the end of the 32-hour period of operation in such manner, the introduction of bromine was discontinued, but the introduction of the other starting materials was continued for about 15 minutes in order that the total amount of chlorine would correspond approximately to the molecular equivalent of the bromine used during operation. The vapors issuing from the retort were treated with sufficient water to condense the brominated pyridine compounds and form an aqueous solution thereof. This solution was treated with an aqueous caustic soda solution to decompose the hydrochlorides of the pyridine compounds and to liberate the latter in free form. The resultant mixture was analyzed and found to contain 640 pounds (8.1 moles) of pyridine, 771 pounds (4.88 moles) of 3-bromopyridine, and 240 pounds (1.013 moles) of 3.5-dibromopyridine. As starting materials in the process, a total of 1191 pounds (15.1 moles) of pyridine, 640 pounds (4.0 moles) of bromine, 284 pounds (4.0 moles) of chlorine, and 565 pounds (15.5 moles) of hydrogen chloride had been employed. The yield of 3-bromopyridine was 70 per cent of theoretical, based on the pyridine consumed in the reaction. The 3-bromopyridine product contained 61 per cent of the bromine which had been employed as a starting material.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method for the production of 3-bromopyridine hydrochloride, the steps of introducing pyridine hydrochloride and a mixture of chlorine and bromine in the proportions of not more than 1.1 moles of chlorine per mole of bromine into a liquid fused mixture consisting for the most part of pyridine hydrochloride while distilling 3-bromopyridine hydrochloride and dibromopyridine from the reaction mixture as they are formed.

2. A continuous method for the production of 3-bromopyridine hydrochloride which comprises passing pyridine hydrochloride and an approximately equimolecular mixture of chlorine and bromine into a liquid fused mixture consisting for the most part of pyridine hydrochloride at rates such as to maintain in the reaction mixture at least 5 molecular equivalents of pyridine hydrochloride per mole of bromine while heating the mixture to distill 3-bromopyridine hydrochloride and dibromopyridine therefrom as they are formed.

3. The method as described in claim 2, wherein a large part of the heat required for the distillation is supplied by reacting hydrogen chloride with pyridine to form pyridine hydrochloride and feeding the latter, while hot due to the heat of reaction, to the bromination reaction for the formation of 3-bromopyridine hydrochloride.

4. The method as described in claim 2, wherein pyridine hydrochloride fed to the bromination reaction is freshly formed from pyridine and hydrogen chloride and heat generated by thus forming the pyridine hydrochloride is employed to heat the bromination mixture and distill brominated pyridine compounds therefrom and wherein the vapors issuing from the bromination mixture are dephlegmated to condense pyridine hydrochloride with resultant absorption by the latter of bromine in the vapor mixture and return of the condensed pyridine hydrochloride and bromine to the bromination reaction.

5. The method as described in claim 2, wherein pyridine hydrochloride is formed by reacting hydrogen chloride with pyridine and, while hot due to heat generated in said reaction, is fed to the bromination reaction for the formation of 3-bromopyridine hydrochloride, and wherein the reaction products vaporized from the bromination mixture are treated with sufficient water to condense and form an aqueous solution of the 3-bromopyridine hydrochloride and dibromopyridine hydrochloride products.

6. The method as described in claim 2, wherein pyridine hydrochloride is formed by reacting hydrogen chloride with pyridine and, while hot due to heat generated by the reaction, is fed to the bromination reaction for the formation of 3-bromopyridine hydrochloride, and wherein material vaporized from the bromination reaction is dephlegmated to condense and return unreacted bromine and pyridine hydrochloride to the bromination reaction and the remaining vapors are treated with sufficient water to condense and form an aqueous solution of the 3-bromopyridine hydrochloride and 3.5-dibromopyridine hydrochloride products.

7. A continuous method for the bromination of pyridine hydrochloride which comprises reacting hydrogen chloride with pyridine to form pyridine hydrochloride which is hot due to the heat of reaction, passing the hot pyridine hydrochloride and an approximately equimolecular mixture of chlorine and bromine into a liquid fused mixture, consisting for the most part of pyridine hydrochloride, at rates of flow such as to maintain in the bromination mixture at least 5 molecular equivalents of pyridine hydrochloride per mole of bromine, while continuing such introduction of pyridine hydrochloride, chlorine and bromine, heating the bromination mixture at a temperature between 160° and 230° C. to vaporize 3-bromopyridine hydrochloride and 3.5-dibromopyridine therefrom, dephlegmating the vapors to condense and return unreacted bromine and pyridine hydrochloride to the bromination reaction, treating the remaining vapors with sufficient water to condense and form an aqueous solution of the 3-bromopyridine hydrochloride and 3.5-dibromopyridine hydrochloride products, treating the latter with alkali, and distilling to separate 3-bromopyridine from the mixture.

8. In a method for the nuclear bromination of pyridine hydrochloride by reacting the latter with bromine, the step of also adding chlorine to the reaction mixture in amount corresponding approximately to the molecular equivalent of the bromine while heating the mixture sufficiently to maintain it in fused condition and to distill 3-bromopyridine hydrochloride from the mixture as it is formed.

9. The method as described in claim 8 wherein the chlorine and bromine are added simultaneously to the reaction mixture.

FRED LOWELL TAYLOR.

REFERENCES CITED

The following references are of record in the file of this patent:

Englert Journal American Chem. Soc. (1929), page 863.

Wibaut, Rec. de Trav. Chemie de Pays Bas, vol. 58 (1939), page 713.

Maier "Das pyridin und seine derivatives" pages 81, 82 (1945).